April 23, 1929.  J. L. SCHWARTZ  1,710,194
SIDEWALK BICYCLE
Filed April 4, 1927
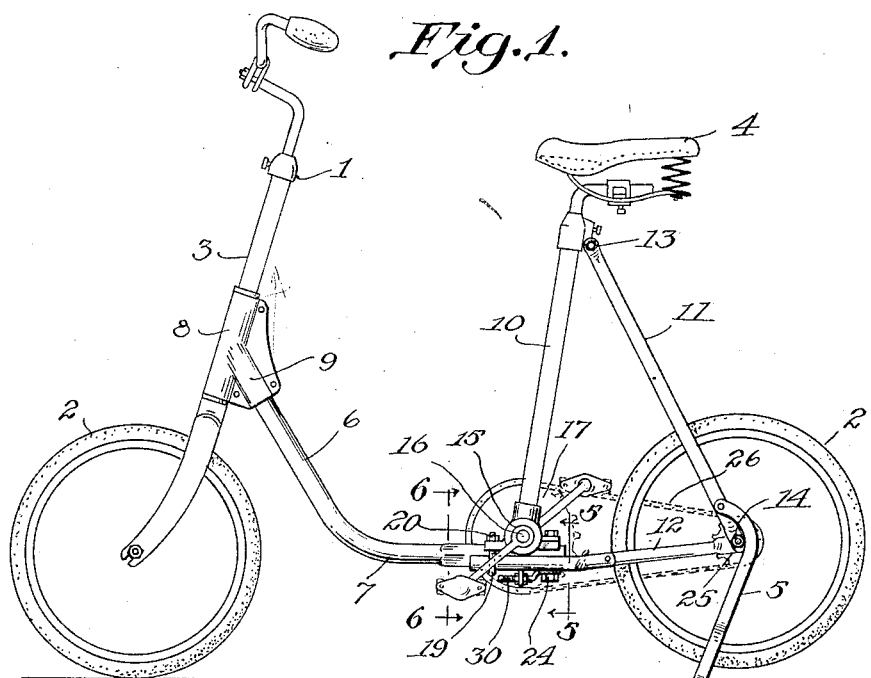
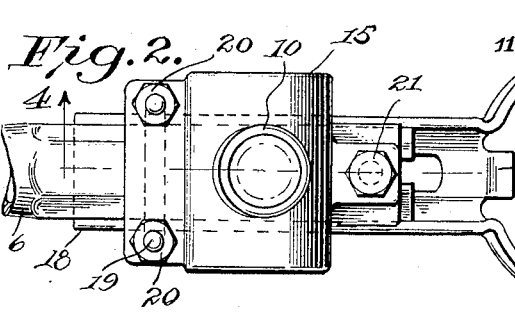
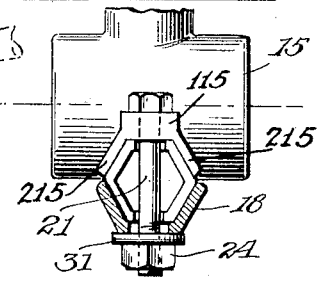
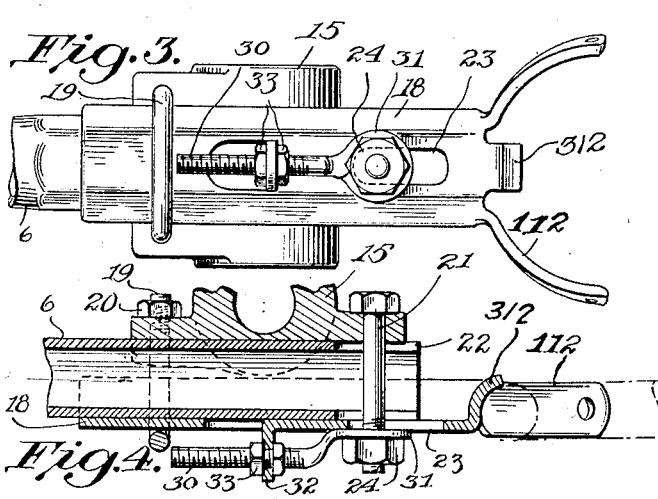
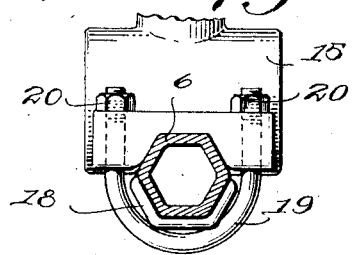
Inventor
Joseph L. Schwartz
Eccleston & Eccleston,
Attorneys Patented Apr. 23, 1929.

1,710,194

UNITED STATES PATENT OFFICE.

JOSEPH L. SCHWARTZ, OF PHILADELPHIA, PENNSYLVANIA, ASSIGNOR TO SIDWAY-TOPLIFF COMPANY, OF WASHINGTON, PENNSYLVANIA.

SIDEWALK BICYCLE.

Application filed April 4, 1927. Serial No. 180,853.

This invention relates to children's vehicles of the type which are self-propelled and has special reference to two-wheeled vehicles commonly known as sidewalk bicycles.

In the manufacture of devices of this type it is essential that the cost be kept as low as is consistent with strength and durability of the product. It is therefore important that the vehicles be so constructed as to be quickly and easily assembled. It is also essential that the vehicles be readily adaptable to crating and shipment.

Accordingly it is an object of the present invention to so design the sidewalk bicycle forming the subject matter of the present application that it is adapted to be shipped in knockdown condition and may be easily and quickly assembled.

A further object of the invention resides in the provision of a novel type of adjustment for tightening the sprocket chain of the bicycle.

Other objects and advantages of the invention will be apparent from the following description when taken in connection with the accompanying drawing; in which Figure 1 is a side elevation of the sidewalk bicycle.

Figure 2 is an enlarged detail plan view of the chain tightening mechanism.

Figure 3 is a bottom view of the mechanism shown in Figure 2.

Figure 4 is a section taken on line 4—4 of Figure 2.

Figure 5 is a section taken on line 5—5 of Figure 1; and

Figure 6 is a section taken on line 6—6 of Figure 1.

Referring to the drawings in greater detail the numeral 1 designates generally a girl's sidewalk bicycle which includes the rubber tired wheels 2, steering post 3, seat 4, and prop 5.

The main portion of the sidewalk bicycle is composed of a front frame and a rear frame; the front frame comprising a single bar 6 which is bent downwardly as indicated in Figure 1 and is provided with a horizontal extension 7. The upwardly inclined portion of the front frame or bar 6 is received in the metal stamping 8 encircling the steering post and provided with a socket 9.

The rear frame of the bicycle is of triangular design and consists of the upwardly inclined seat post 10 and bars 11, and the horizontal fork 12. The inclined bars 11 are pivoted at their upper ends to the upper end of the seat post 10 as indicated by the numeral 13 and at their lower ends to the rear ends of the horizontal fork 12 as indicated by numeral 14.

The lower end of the seat post 10 is seated in a bearing member 15 in which is mounted the driving axle 16 having fixed to one end thereof a sprocket wheel 17. A clamping plate 18 cooperates with the bearing member 15 to receive and hold the bar 6. Integral with the clamping plate 18, at the rear thereof, are diverging arms 112.

The clamping plate 18 is locked to the bar 6 by means of a U-shaped bolt 19 which extends beneath the clamping plate 18 and has its ends secured to the bearing member 15 by means of nuts 20. A bolt 21 also extends through the bearing member 15 and passes through the slotted end 22 of the bar 6 and through a slot 23 in the clamping plate 18 where it is locked by means of a nut 24.

A rear axle carrying the sprocket wheel 25 is rotatably mounted at the joint between the bars 11 and fork 12. A sprocket chain 26 connects the sprocket wheels 17 and 25 for driving the bicycle in the usual manner. The U-shaped member 12 has its base portion seated in the arms 112 of the clamping plate 18, and this latter element is provided with an upwardly inclined lug 312 against which the member 12 seats. The arms 112 are secured to the member 12 by rivets or the like as indicated in Figure 2. An adjusting screw 30 is provided for adjusting the tension of the sprocket chain 26. This screw is provided with an apertured head 31 which is received on the lower end of the bolt 21 thereby fixedly securing the adjusting screw with respect to the bearing member 15 and inclined bar 10. The opposite end of the adjusting screw 30 passes through a lug 32 struck out from the clamping plate 18 and nuts 33 are threaded thereon for moving and locking this adjusting screw with respect to the lug 32.

It will thus be apparent that by loosening the clamping members 19 and 21 and by properly adjusting the nuts 33, the clamping plate 18 and with it the fork 12, may be moved longitudinally with respect to the bearing member 15, and with it the seat post 10, thereby varying the distance between the sprocket wheels 17 and 25 to adjust the tension of the sprocket chain 26.

From an inspection of Figures 5 and 6 it will be observed that the rear end of the bar 6 is made of hexagonal cross section, whereas the clamping surface of the bearing member 15 is formed with a base portion 115 and two angularly disposed side portions 215 to engage three sides of the end of the bar 6 while the clamping surface of the plate 18 is also formed with a base and two side portions to engage the remaining three sides of the end of the bar 6 so as to prevent relative rotation between these parts.

From the foregoing description taken in connection with the accompanying drawings it will be apparent that I have devised a girl's sidewalk bicycle in which the main portion thereof is composed of front and rear frame members which may be readily disconnected for shipping purposes and which may also be readily assembled when it is desired to place the sidewalk bicycle in use. It will also be apparent that I have devised a relatively simple and inexpensive construction of a sidewalk bicycle which is strong and durable in operation and which is readily adjustable by the simple operation of an adjusting screw to vary the tension on the sprocket chain which forms an element of the driving mechanism.

In accordance with the patent statutes I have described what I now believe to be the best embodiment of the invention but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A sidewalk bicycle including a triangular rear frame comprising a seat post, a rearwardly inclined member pivoted to the upper end of said seat post, a substantially horizontal member connected to the lower end of said rearwardly inclined member, sprocket wheels mounted on the lower ends of said seat post and rearwardly inclined member, a sprocket chain associated with said wheels, a front frame or bar, clamping means for securing the front frame to the lower end of the seat post, and an adjustable connection between said seat post and clamping means to vary the tension on said chain.

2. A sidewalk bicycle including a triangular rear frame comprising a seat post, a rearwardly inclined member pivoted to the upper end of the seat post, a substantially horizontal member connected to the lower end of said rearwardly inclined member, sprocket wheels mounted on the lower ends of said seat post and rearwardly inclined member, a front frame or bar, a clamping plate connected to the forward end of said horizontal member, means for drawing said clamping plate into clamping position with respect to said front frame, and an adjustable connection between the clamping plate and seat post.

3. A sidewalk bicycle including a seat post, a clamping plate adjustably connected to the lower end of said seat post, and a front frame member or bar having its rear end disposed between said clamping plate and seat post.

4. A sidewalk bicycle including a seat post, a base member of angular cross section secured to the lower end of the seat post, a clamping plate of angular cross section disposed in cooperative relation to said base member, a front frame or bar having a rear end of angular cross section disposed between said base member and clamping plate, and means for adjusting said clamping plate toward and from the base member.

5. A sidewalk bicycle including a seat post, a bearing secured to the lower end of the seat post, a base member of angular cross section connected to the under side of the bearing, a clamping plate of angular cross section disposed in cooperative relation to said base member, a front frame or bar having a rear end of angular cross section disposed between said base member and clamping plate, and means for adjusting said clamping plate toward and from the base member.

JOSEPH L. SCHWARTZ.